(12) United States Patent
Yang et al.

(10) Patent No.: US 9,778,802 B2
(45) Date of Patent: Oct. 3, 2017

(54) IN-CELL TOUCH PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN); Hailin Xue, Beijing (CN); Yingming Liu, Beijing (CN); Weijie Zhao, Beijing (CN); Xiaoliang Ding, Beijing (CN); Hongjuan Liu, Beijing (CN); Changfeng Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 196 days.

(21) Appl. No.: 14/648,087

(22) PCT Filed: Sep. 23, 2014

(86) PCT No.: PCT/CN2014/087156
§ 371 (c)(1),
(2) Date: May 28, 2015

(87) PCT Pub. No.: WO2015/180322
PCT Pub. Date: Dec. 3, 2015

(65) Prior Publication Data
US 2016/0266675 A1  Sep. 15, 2016

(30) Foreign Application Priority Data
May 30, 2014  (CN) .......................... 2014 1 0239887

(51) Int. Cl.
*G06F 3/044* (2006.01)
*G02F 1/1333* (2006.01)
*G06F 3/041* (2006.01)

(52) U.S. Cl.
CPC ............ *G06F 3/044* (2013.01); *G02F 1/1333* (2013.01); *G06F 3/0412* (2013.01);
(Continued)

(58) Field of Classification Search
CPC ...... G06F 3/044; G06F 3/0416; G06F 3/0412; G06F 2203/04112; G06F 2203/04111; G02F 1/1333
(Continued)

(56) References Cited

U.S. PATENT DOCUMENTS 9,342,177 B2 *  5/2016  Seo ................. G06F 3/0412
9,405,330 B2 *  8/2016  Yamagishi .............. G06F 3/044
(Continued)

FOREIGN PATENT DOCUMENTS

CN  103793120 A  5/2014
CN  104020906 A  9/2014
(Continued)

OTHER PUBLICATIONS

International Search Report and Written Opinion both dated Mar. 4, 2015; PCT/CN2014/087156.

*Primary Examiner* — Dmitriy Bolotin
(74) *Attorney, Agent, or Firm* — Ladas & Parry LLP

(57) ABSTRACT

An in-cell touch panel and a display device are provided, and the in-cell touch panel includes: an upper substrate and a lower substrate arranged oppositely to each other; a conductive layer which is provided on a side, facing the lower substrate, of the upper substrate or on a side, facing the upper substrate, of the lower substrate, and comprises a plurality of hollowed-out regions arranged in a matrix form;
(Continued)

a plurality of self-capacitance electrodes insulated from the conductive layer and arranged in a layer in which the conductive layer is provided, each of the hollowed-out regions being provided therein with at least one of the self-capacitance electrodes; and a plurality of conductive wires respectively electrically connected with the self-capacitance electrodes. This in-cell touch panel can reduce the number of the conductive wires, so as to facilitate a narrow frame design and reduce the occurrence possibility of a larger touch blind area to a certain extent.

20 Claims, 7 Drawing Sheets

(52) U.S. Cl.
CPC .. *G06F 3/0416* (2013.01); *G06F 2203/04111* (2013.01); *G06F 2203/04112* (2013.01)

(58) Field of Classification Search
USPC .......................................................... 345/173
See application file for complete search history.

(56) References Cited

U.S. PATENT DOCUMENTS

| | | | | |
|---|---|---|---|---|
| 2010/0194697 A1* | 8/2010 | Hotelling | ............... | G06F 3/0412 345/173 |
| 2011/0096023 A1* | 4/2011 | Shih | ...................... | G06F 3/0412 345/174 |
| 2011/0242444 A1* | 10/2011 | Song | ..................... | G06F 3/0412 349/43 |
| 2012/0086654 A1* | 4/2012 | Song | ..................... | G06F 3/0412 345/173 |
| 2012/0162584 A1* | 6/2012 | Chang | .................. | G06F 3/0412 349/106 |
| 2012/0218199 A1* | 8/2012 | Kim | ...................... | G06F 3/0412 345/173 |
| 2013/0033439 A1* | 2/2013 | Kim | .................... | G02F 1/13338 345/173 |
| 2013/0314625 A1* | 11/2013 | Tsai | ........................ | G06F 3/044 349/12 |
| 2013/0335366 A1* | 12/2013 | Lee | .......................... | G06F 3/044 345/174 |
| 2014/0062944 A1* | 3/2014 | Wang | .................... | G06F 3/0412 345/174 |
| 2014/0092326 A1* | 4/2014 | Zhou | ..................... | G06F 3/0412 349/12 |
| 2014/0111466 A1 | 4/2014 | Kim et al. | | |
| 2014/0132560 A1 | 5/2014 | Huang et al. | | |
| 2014/0145996 A1* | 5/2014 | Sugita | ..................... | G06F 3/044 345/173 |
| 2014/0168161 A1* | 6/2014 | Sugita | ..................... | G06F 3/044 345/174 |
| 2014/0210774 A1* | 7/2014 | Kim | ....................... | G06F 3/044 345/174 |
| 2014/0333582 A1* | 11/2014 | Huo | .................... | G02F 1/13338 345/174 |
| 2014/0362031 A1* | 12/2014 | Mo | .......................... | G09G 3/36 345/174 |
| 2015/0002421 A1* | 1/2015 | Kim | ....................... | G06F 3/041 345/173 |
| 2015/0029118 A1* | 1/2015 | Xu | .......................... | G06F 3/044 345/173 |
| 2015/0253899 A1* | 9/2015 | Yang | ...................... | G06F 3/044 345/174 |
| 2016/0018922 A1* | 1/2016 | Wang | .................... | G06F 3/0412 345/174 |

FOREIGN PATENT DOCUMENTS

JP  2014-099159 A  5/2014
WO  2014/045601 A1  3/2014

* cited by examiner

IN-CELL TOUCH PANEL AND DISPLAY DEVICE

TECHNICAL FIELD

At least one embodiment of the present disclosure relates to an in-cell touch panel and a display device.

BACKGROUND

With the rapid growth of display techniques, the touch screen panel has gradually run into each aspect of human's life. Presently, according to a structure, the touch screen panel may be clarified into add-on mode touch panel, on-cell touch panel, and in-cell touch panel. The in-cell touch screen panel is further clarified into mutual-capacitance touch screen panel and self-capacitance touch screen panel. The self-capacitance touch screen panel is attractive to main panel manufacturers due to its higher touch sensing accuracy and signal to noise ratio.

Presently, a method that the self-capacitance touch screen panel achieves the detection of a finger touch position by means of the self-capacitance principle may comprise that: the touch screen panel is provided with a plurality of self-capacitance electrodes arranged in a same layer and insulated from each other, when the screen is not touched by a human body, the capacitance that each of the self-capacitance electrodes is subjected to is a fixed value; when the human body touches the screen, the capacitance that the corresponding self-capacitance electrode is subjected to is the sum of the fixed value and a body capacitance; and a touch detection chip may determine a touch position by detecting the variation of the capacitance value of each of the self-capacitance electrodes during a touch period.

In a self-capacitance touch screen panel, each of the self-capacitance electrodes needs to be connected with the touch detection chip through a separate leading wire. As illustrated in FIGS. 1a and 1b, each leading wire may comprise a conductive wire 2 for connecting a self-capacitance electrode 1 to a margin frame of the touch screen panel, and a peripheral wire 4 provided at the margin frame for conducting the self-capacitance electrode 1 to a wiring terminal 3 of a touch detection chip. In FIG. 1a, the conductive wires 2 and the self-capacitance electrodes 1 are provided in a same layer; and in FIG. 1b, the self-capacitance electrodes 1 are provided in a layer different from the layer in which the conductive wires 2 are provided, and each of the self-capacitance electrodes 1 is electrically connected with a corresponding conductive wire 2 through a via hole 5.

SUMMARY

At least one embodiment of the present disclosure provides an in-cell touch panel and a display device, to reduce the number of conductive wires in the in-cell touch panel, so as to facilitate a narrow frame design and depress the occurrence possibility of larger touch blind areas to a certain extent.

In a first aspect, at least one embodiment of the present disclosure provides an in-cell touch panel, which comprises: an upper substrate and a lower substrate arranged oppositely to each other, a conductive layer which is provided on a side, facing the lower substrate, of the upper substrate or on a side, facing the upper substrate, of the lower substrate, and comprises a plurality of hollowed-out regions arranged in a matrix form; a plurality of self-capacitance electrodes insulated from the conductive layer and arranged in a layer in which the conductive layer is arranged, each of the hollowed-out regions being provided therein with at least one of the self-capacitance electrodes; and a plurality of conductive wires uncrossed with each other, respectively electrically connected with the self-capacitance electrodes and arranged in a layer different from the layer in which the conductive layer is arranged. The conductive wires that the self-capacitance electrodes are respectively connected with are different.

In a second aspect, at least one embodiment of the present disclosure provides a display device comprising the above-mentioned in-cell touch panel provided by the embodiment of the present disclosure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

The inventor of the present application noted that, there are a large quantity of self-capacitance electrodes; taking such a case in which the area of each of the self-capacitance electrodes occupies is 5 mm*5 mm as an example, a 5-inch liquid crystal display requires 264 self-capacitance electrodes; and when each of the self-capacitance electrodes is designed to be smaller, there can be even more self-capacitance electrodes. Therefore, in the cases shown in FIGS. 1a and 1b, a large quantity of conductive wires are respectively connected with self-capacitance electrodes, accordingly, there are also a large quantity of peripheral wires provided at a margin frame and connected, in a one-to-one manner, with the conductive wires, and this can be unfavorable for the narrow frame design; or alternatively, when the conductive wires and the self-capacitance electrodes are arranged in a same layer, the large quantity of conductive wires causes large touch blind areas.

In at least one embodiment of the present disclosure, an in-cell touch panel (in-cell touch screen panel) comprises: an upper substrate and a lower substrate arranged oppositely to each other; a conductive layer which is provided on a side, facing the lower substrate, of the upper substrate or on a side, facing the upper substrate, of the lower substrate, and comprises a plurality of hollowed-out regions arranged in a matrix form; a plurality of self-capacitance electrodes insulated from the conductive layer and arranged in a layer in which the conductive layer is arranged, each of the hollowed-out regions being provided therein with at least one of the self-capacitance electrodes; and a plurality of conductive wires uncrossed with each other, respectively electrically connected with the self-capacitance electrodes and arranged in a layer different from the layer in which the conductive layer is arranged. The conductive wires that the self-capacitance electrodes are respectively connected with are different.

Figure 1A:
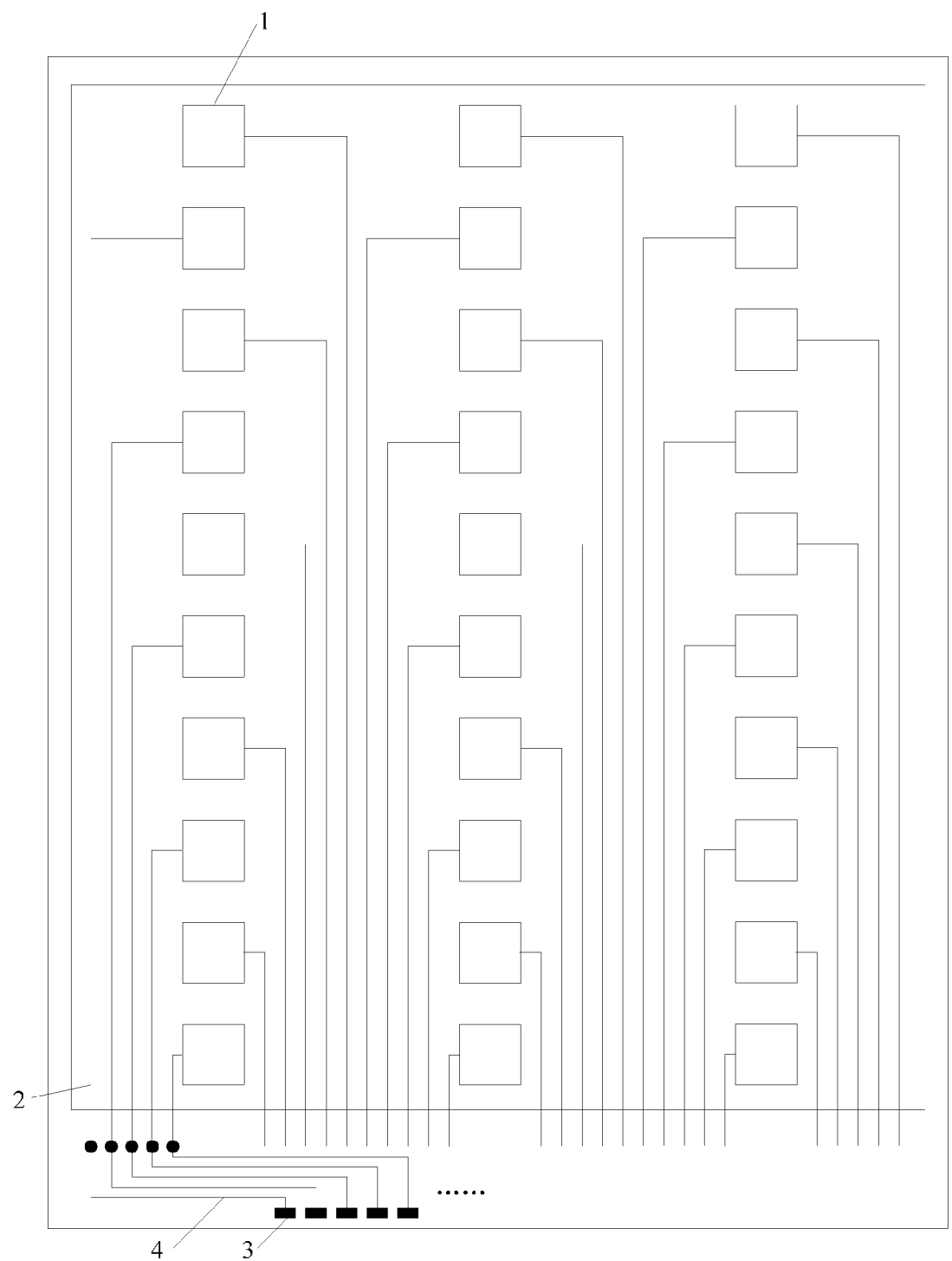
FIG. 1a is a structural schematic top view of a touch screen panel in which conductive wires and self-capacitance electrodes are arranged in a same layer.
Figure 1B:
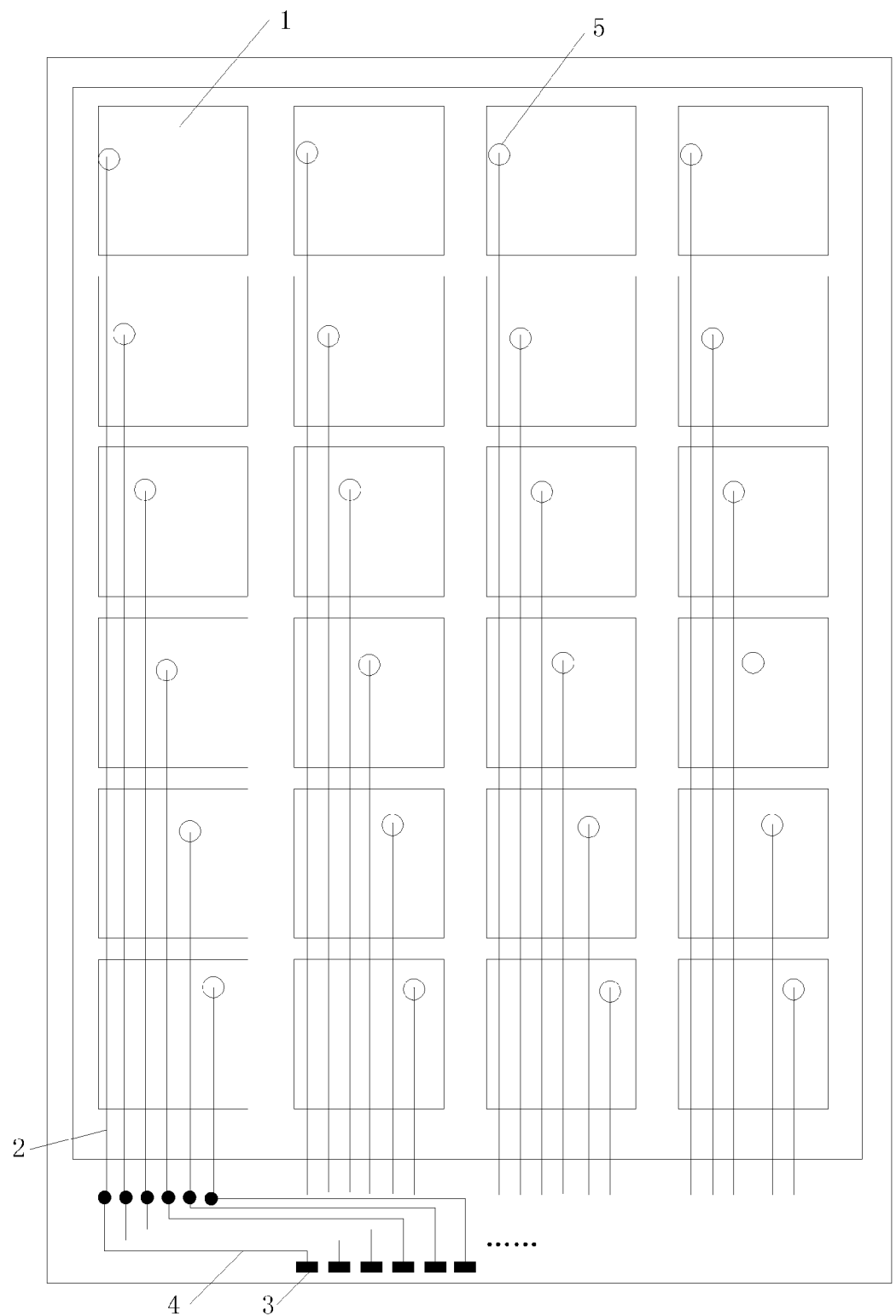
FIG. 1b is a structural schematic top view of a touch screen panel in which conductive wires and self-capacitance electrodes are arranged in different layers.

As compared with the cases shown in FIGS. 1a and 1b, in the embodiment of the present disclosure, the self-capacitance electrodes and the conductive layer are arranged in a same layer, such that, for the touch screens of identical dimensions, the number of the self-capacitance electrodes can be reduced, because the conductive layer can occupy a certain area, and thus the reduction of the number of conductive wires respectively connected with the self-capacitance electrodes is achieved, so as to facilitate a narrow frame design and reduce the occurrence possibility of a larger touch blind area to a certain extent.

The embodiments of the present disclosure will be further described in detail with reference to the accompanying drawings.

The thicknesses and shapes of all film layers in the drawings do not reflect actual ratio, but aim to illustratively describe the present disclosure.

An in-cell touch panel provided by at least one embodiment of the present disclosure comprises: an upper substrate and a lower substrate arranged oppositely to each other; a conductive layer which is provided on a side, facing the lower substrate, of the upper substrate or on a side, facing the upper substrate, of the lower substrate, and comprises a plurality of hollowed-out regions arranged in a matrix form; a plurality of self-capacitance electrodes insulated from the conductive layer and arranged in a layer in which the conductive layer is arranged, each of the hollowed-out regions being provided therein with a self-capacitance electrode; and a plurality of conductive wires uncrossed with each other, respectively electrically connected with the self-capacitance electrodes and arranged in a layer different from the layer in which the conductive layer is arranged. The conductive wires that the self-capacitance electrodes are respectively connected with are different.

As compared with the cases shown in FIGS. 1a and 1b, in the embodiment of the present disclosure, the self-capacitance electrodes and the conductive layer are arranged in a same layer, such that, for the touch screens of identical dimensions, the number of the self-capacitance electrodes can be reduced, because the conductive layer can occupy a certain area, in such way the reduction of the number of conductive wires respectively connected with the self-capacitance electrodes is achieved, and this facilitate a narrow frame design, reduce the occurrence possibility of a larger touch blind area to a certain extent, and also facilitate the reduction of the cost of the touch detection chip.

It is to be noted that, the upper substrate and the lower substrate in the embodiment of the present disclosure are respectively the upper substrate and the lower substrate which are arranged oppositely to each other and included in the display panel of a display device. For instance, when the display device is a liquid crystal display device, the display panel is a liquid crystal panel, the upper substrate may be a color filter substrate, and the lower substrate may be an array substrate.

In various embodiments, the film layer, in which the conductive layer and the self-capacitance electrodes are arranged, may be an additionally added film layer having an electric conductivity function, or can also employ a film layer, arranged on the side, facing the lower substrate, of the upper substrate or on the side, facing the upper substrate, of the lower substrate, such as a common electrode layer.

For example, when the film layer, in which the conductive layer and the self-capacitance electrodes are arranged, is an additionally added conductive film layer, and this film layer may be provided at any position on the side, facing the lower substrate, of the upper substrate, or at any position on the side, facing the upper substrate, of the lower substrate.

For instance, an example that the conductive layer is provided on the side, facing the lower substrate, of the upper substrate is given. Assuming that the side, facing the lower substrate, of the upper substrate is stacked with a black matrix layer, a color filter layer, a planarization layer and a spacer layer, and the conductive layer is arranged between the black matrix layer and the color filter layer, or the conductive layer is arranged between the color filter layer and the planarization layer; or the conductive layer is arranged between the planarization layer and the spacer layer.

It is to be noted that, the specific embodiments, in which the film layer in which the conductive layer and the self-capacitance electrodes are arranged is provided on the side, facing the upper substrate, of the lower substrate, are similar to the specific embodiments, in which the film layer in which the conductive layer and the self-capacitance electrodes are arranged is provided on the side, facing the lower substrate, of the upper substrate, and repeated description thereof is omitted herein.

For example, when the film layer, in which the conductive layer and the self-capacitance electrodes are arranged, utilizes a conductive film layer provided on the side, facing the lower substrate, of the upper substrate, or on the side, facing the upper substrate, of the lower substrate, the conductive layer and the self-capacitance electrode may be used as a common electrode layer.

In the embodiment of the present disclosure, the conductive layer and the self-capacitance electrodes are configured to be used as the common electrode layer, and this can save one film layer, and depress the complexity of manufacturing the in-cell touch panel of the embodiment of the present disclosure.

Figure 2A:
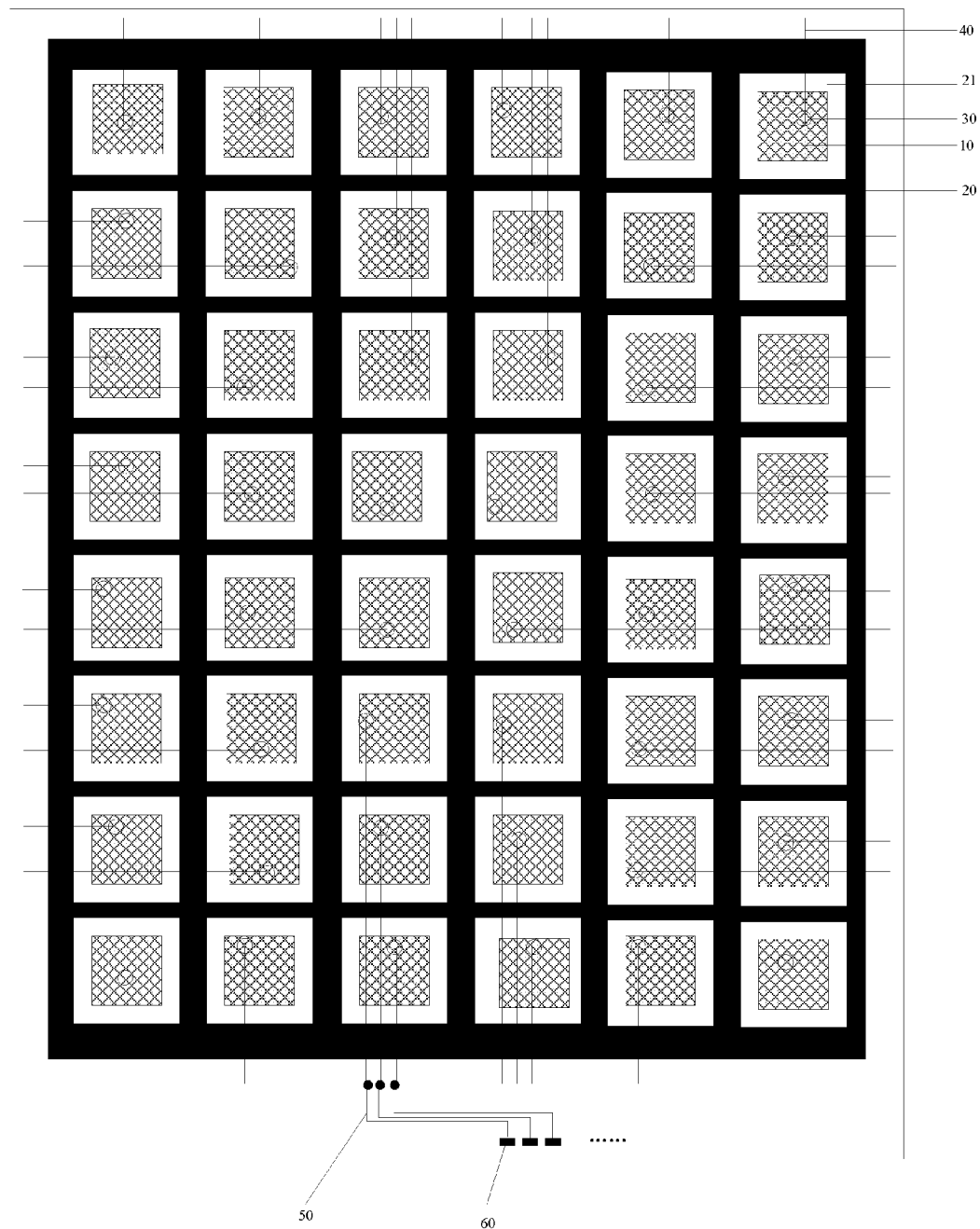
FIGS. 2a-2c are structural schematic top views of an in-cell touch panel according to an embodiment of the present disclosure.
Figure 2B:
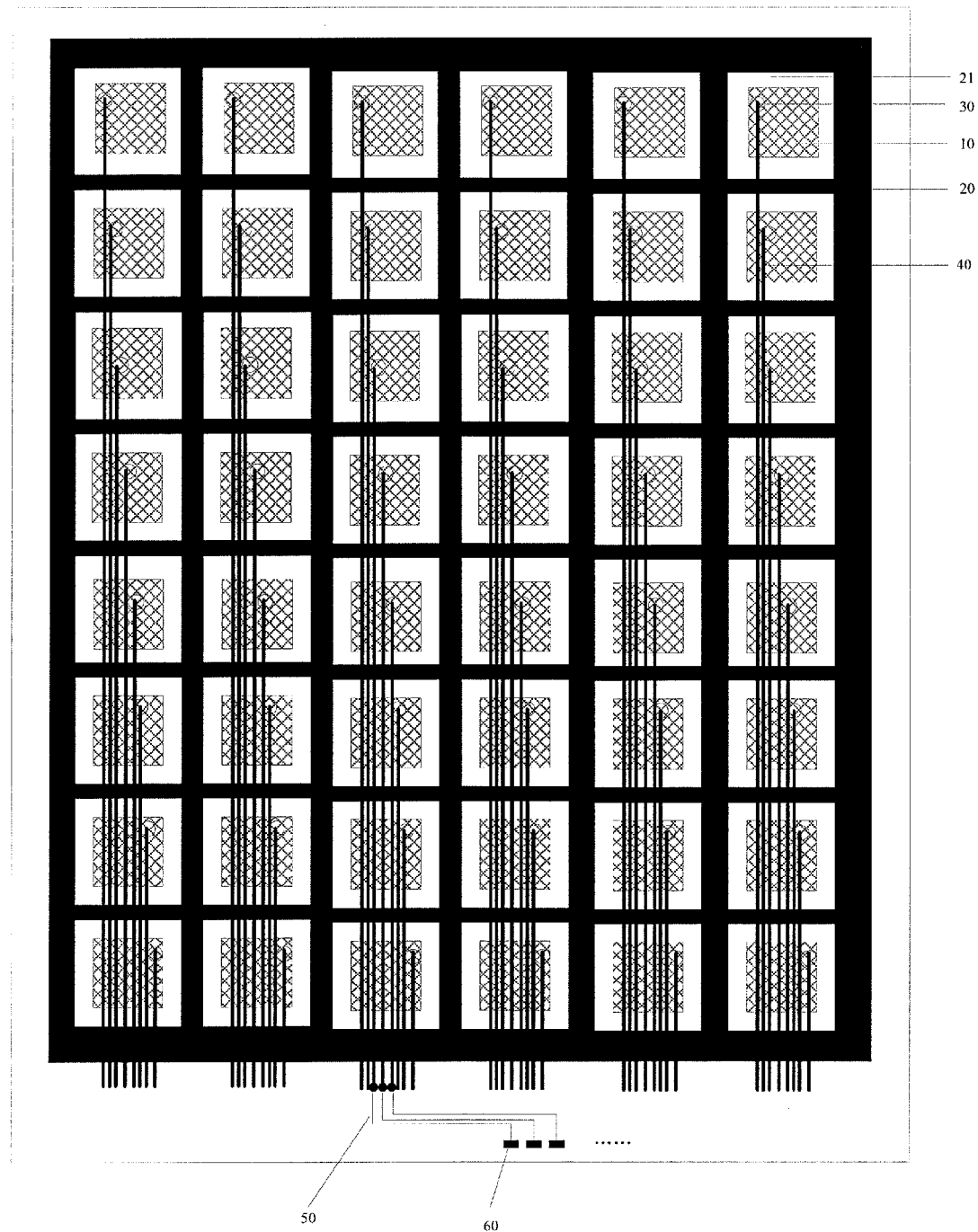

In various embodiments, each of the self-capacitance electrodes may have a regular shape, such as square, rectangle, triangle and circle. For instance, as illustrated in FIGS. 2a and 2b, the shape of each self-capacitance electrode 10 is a square. The shape of each of the self-capacitance electrodes may also be any one of irregular shapes. In embodiments of the present disclosure, when the self-capacitance electrodes respectively present a regular shape, the manufacture complexity of the self-capacitance electrodes is lower.

Figure 2C:
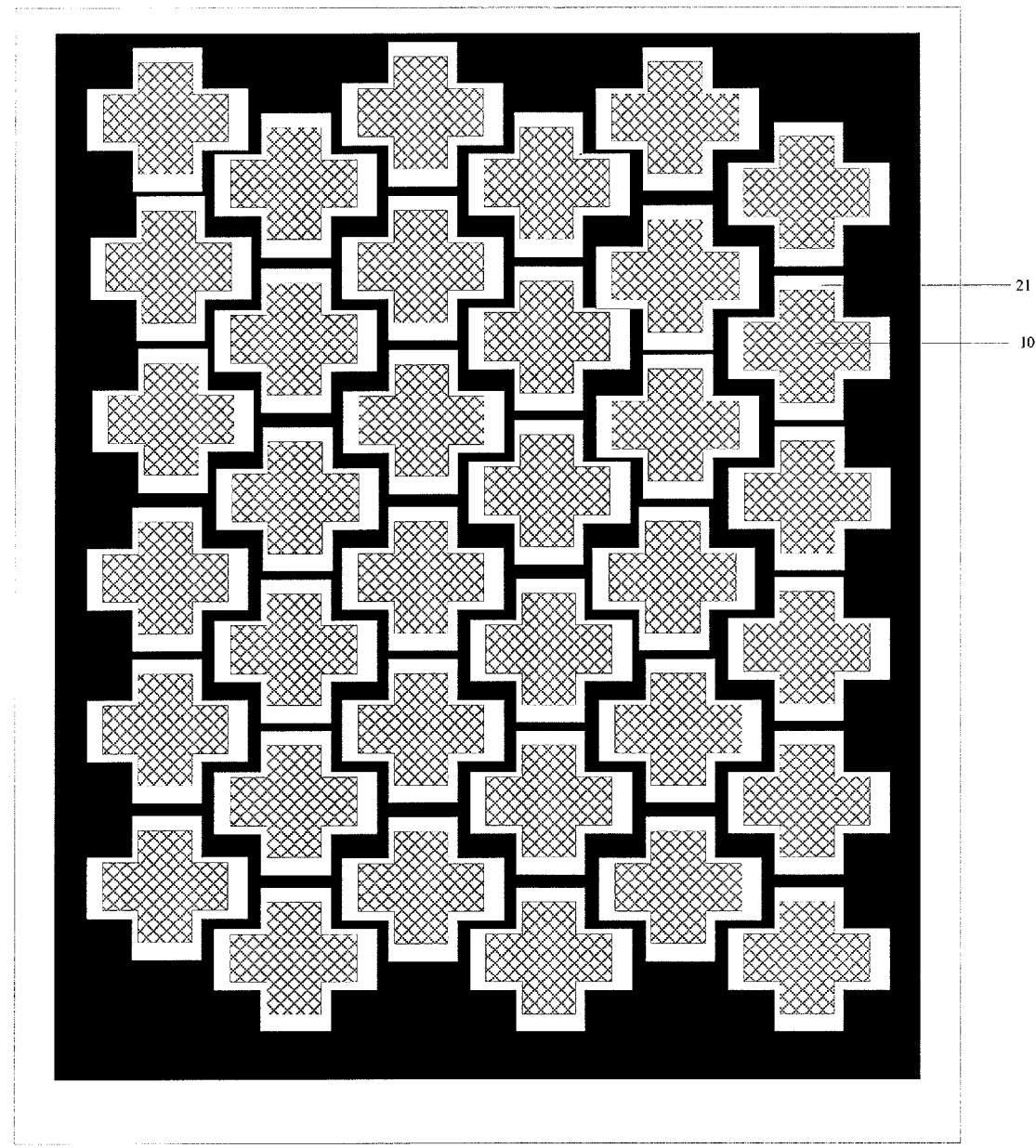

In one embodiment, the shapes of all the self-capacitance electrodes may be identical completely. For example, as illustrated in FIGS. 2a-2c, all the self-capacitance electrodes 10 included in the in-cell touch panel have an identical shape. Of course, the shapes of the self-capacitance electrodes may be partially identical, or alternatively, be completely different. In practice, when the shapes of the self-capacitance electrodes are completely identical, a lower manufacture complexity of the self-capacitance electrodes can be afforded.

In various embodiments, each of the hollowed-out regions may be provided therein with one self-capacitance electrode, or may also be provided therein with a plurality of self-capacitance electrodes. For example, it is possible to determine the number of self-capacitance electrodes provided in each of the hollowed-out regions according to the area that each of the hollowed-out regions occupies. For example, with respect to the example that each of the hollowed-out regions has an area of 6 mm*6 mm and each of the self-capacitance electrodes has an area of 5 mm*5 mm, each of the hollowed-out regions may be provided therein with one self-capacitance electrode.

In one embodiment, for a single hollowed-out region with one self-capacitance electrode provided therein, the hollowed-out region may have its shape identical to that of the self-capacitance electrode. For example, as illustrated in FIGS. 2a-2c, the hollowed-out regions 21 have an identical shape, the self-capacitance electrodes 10 have an identical shape, and the shape of the hollowed-out regions 21 are identical to that of the self-capacitance electrodes 10. Of course, the shape of the hollowed-out region may also be distinct from the shape of the self-capacitance electrode. In the embodiment of the present disclosure, when the shape of the hollowed-out region is identical to that of the self-capacitance electrode, the complexity for manufacturing the in-cell touch panel is lower.

In one embodiment, when each of the hollowed-out regions is provided therein with one self-capacitance electrode and the shape of the hollowed-out region is identical to that of the self-capacitance electrode, the opposite sides which respectively belong to adjacent two self-capacitance electrodes may each be a zigzag line.

For example, the opposite sides, which respectively belong to the two adjacent self-capacitance electrodes and respectively have a zigzag-line shape, may be respectively of a stepped structure, and the two stepped structures have the same shape and match each other; and/or the opposite sides, which respectively belong to the two adjacent self-capacitance electrodes and respectively have a zigzag-line shape, may be respectively of a concave-convex structure, and the two concave-convex structures have the same shape and match each other.

For example, as illustrated in FIG. 2c, each hollowed-out region 21 is provided therein with one self-capacitance electrode 10, all the hollowed-out regions 21 have an identical shape, all the self-capacitance electrodes 10 have an identical shape, and the shape of the hollowed-out regions 21 and the shape of the self-capacitance electrodes 10 are also identical to each other; and each of the opposite sides, which respectively belong to adjacent two self-capacitance electrodes 10, is of a zigzag line, and the opposite sides, respectively shaped to be the zigzag line, of the adjacent two self-capacitance electrodes 10 are respectively of a stepped structure, and the two stepped structures have the same shape and match each other.

In the embodiment of the present disclosure, when each of the hollowed-out regions is provided therein with one self-capacitance electrode and the shapes of the hollowed-out region and the self-capacitance electrode are identical to each other, by designing each of the opposite sides which respectively belong to adjacent two self-capacitance electrodes into a zigzag line, it can be ensured that, when the touch screen is touched, the position touched by a human body may always cover the area where at least one self-capacitance electrode is arranged, to improve the accuracy for determining a touch position.

In the embodiment of the present disclosure, the dimensions of the conductive layer, the hollowed-out region and the self-capacitance electrode need to satisfy the requirement of touch sensing accuracy. For example, when each hollowed-out region is provided therein with one self-capacitance electrode, the distance between any point of the edge of the self-capacitance electrode and the edge of the hollowed-out region has a minimum value that is smaller than a first threshold value; and the conductive layer comprises a plurality of elongated branches respectively arranged between adjacent rows of the hollowed-out regions and between adjacent columns of the hollowed-out regions, and the maximum value for the width of each of the branches is smaller than a second threshold value. In one embodiment, the first threshold value is smaller than 6 μm; and the second threshold value is smaller than 2 mm. In this way, the embodiment of the present disclosure can ensure the touch sensing accuracy.

In one embodiment, the conductive wires and the self-capacitance electrodes may be arranged on the same substrate, that is, both the conductive wires and the self-capacitance electrodes are provided on the side, facing the lower substrate, of the upper substrate, or on the side, facing the upper substrate, of the lower substrate.

In the above-mentioned embodiment, the connection relationship between the conductive wires and the self-capacitance electrodes may adopt a connection relationship between the conductive wires and the self-capacitance electrodes known to the skilled person in this art. For example, the conductive wires that the self-capacitance electrodes are respectively connected to are different, and one self-capacitance electrode is electrically connected to at least one conductive wire. In this way, it is possible to further reduce the number of the conductive wires.

In one embodiment, the conductive wires may be arranged in a layer different from the layer in which the self-capacitance electrodes are arranged; and each self-capacitance electrode and a corresponding conductive wire, which are arranged in different layers, may be electrically connected with each other through a via hole. For example, as illustrated in FIGS. 2a and 2b, each of the self-capacitance electrodes 10 and a corresponding conductive wire 40, which are arranged in different layers, are electrically connected with each other through a via hole 30. In the embodiment of the present disclosure, the conductive wires are arranged in a layer different from the layer in which the self-capacitance electrodes are arranged, and this can eliminate the touch blind areas still better.

In one embodiment, the in-cell touch panel further comprises: a touch detection chip electrically connected with the conductive wires and used for determining a touch position by detecting the variation of the capacitance value of each of the self-capacitance electrodes during a touch-scanning time period, and peripheral wires arranged at a margin frame of the in-cell touch panel and respectively electrically connected with the conductive wires. The conductive wires respectively connect the self-capacitance electrodes to the margin frame of the in-cell touch panel; and the touch detection chip is electrically connected with the peripheral wires through corresponding wiring terminals.

In various embodiments, the touch detection chip is provided on a circuit board, for example, may be provided on a circuit board at the back side of the display device, or alternatively, on a circuit board in the margin frame region of the display device, or on the flexible circuit board included in the lower substrate.

In various embodiments, the conductive wires can be directly and electrically connected with the touch detection chip, or may also be electrically connected with the touch detection chip through corresponding peripheral wires. For example, when the conductive wires are provided on the side, facing the upper substrate, of the lower substrate and the touch detection chip is provided on the flexible circuit board included in the lower substrate, the conductive wires may be directly electrically connected with the touch detection chip; and for example, when the conductive wires are provided on the side, facing the lower substrate, of the upper substrate, and the touch detection chip is provided on a circuit board at the back side of the display device, the conductive wires may be electrically connected with the touch detection chip through corresponding peripheral wires.

In one embodiment, the margin frame of the in-cell touch panel has four sides, and each of the self-capacitance electrodes is connected to a side closest to the self-capacitance electrode through a corresponding conductive wire on the basis that the conductive wires do not intersect each other. For example, as illustrated in FIG. 2a, the margin frame of the in-cell touch panel has four sides, and each of the self-capacitance electrodes 10 is connected to a side closest to the self-capacitance electrode through a corresponding conductive wire 40 on the basis that the conductive wires 40 do not intersect each other.

In one embodiment, the margin frame of the in-cell touch panel has a rectangular shape, and the direction toward which each of the conductive wires extends is consistent with the short-side direction of the margin frame. For example, as illustrated in FIG. 2b, the margin frame of the in-cell touch panel has a rectangular shape, and the direction toward which each of the conductive wires 40 is consistent with a short-side direction of the margin frame (each of the conductive wires extends toward the direction where a short side of the margin frame is provided). In the embodiment of the present disclosure, the direction toward which each of the conductive wires extends is consistent with the short-side direction of the margin frame, and this can easily achieve in ensure that the conductive wires do not intersect each other so as to obtain the electrical insulation between the conductive wires. Of course, in specific practice, when the margin frame of the in-cell touch panel has a rectangular shape, the direction toward which each of the conductive wires extends may also be consistent with a long-side direction of the margin frame.

In the in-cell touch panel, the peripheral wires are generally provided on the lower substrate. In one embodiment, when the self-capacitance electrodes and conductive wires are arranged on the upper substrate, the conductive wires may be respectively electrically connected with the peripheral wires arranged on the lower substrate by means of the top-to-bottom conduction effect of conducting particles (for example, gold balls) within a frame sealant; and in one embodiment, when the self-capacitance electrodes and conductive wires are arranged on the lower substrate, the conductive wires may be respectively directly electrically connected with the peripheral wires arranged on the lower substrate.

In the above-mentioned embodiments, when the film layer, in which the conductive layer and the self-capacitance electrodes are arranged, utilizes a conductive film layer provided on the side, facing the lower substrate, of the upper substrate or on the side, facing the upper substrate, of the lower substrate, the conductive layer may keep the original connection relationship of this film layer unchanged, or may also be connected with the touch detection chip; and when the film layer, in which the conductive layer and the self-capacitance electrodes are arranged, is a newly added conductive film layer, the conductive layer may be not connected with other components, or may also be connected with other components through conductive wires, for example, be connected with a power supply unit through a conductive wire, or alternatively, be connected with the touch detection chip through a conductive wire.

In one embodiment, the conductive layer and the self-capacitance electrodes may be used as a common electrode layer. For example, the conductive layer is provided on the side, facing the upper substrate, of the lower substrate; the in-cell touch panel further comprises common electrode lines (gate Vcom lines) provided in a layer in which gate electrodes and gate lines, arranged on the side, facing the upper substrate, of the lower substrate are arranged, and electrically insulated from the gate electrodes and the gate lines; the common electrode lines and the common electrode layer are provided in different layers, and the common electrode lines are electrically connected with the common electrode layer through corresponding via holes; and the common electrode lines are configured to be used as the conductive wires. In the embodiment of the present disclosure, the common electrode lines connecting the common electrode layer are used as the conductive wires, and this can further reduce the number of the conductive wires.

It is to be noted that, the principle that the touch detection chip in embodiments of the present disclosure determines a touch position can adopt the self-capacitance, principle known to the skilled person in this art, for determining a touch position by a touch detection chip, and repeated description is omitted herein; and in the following, a description will be made to the principle for reducing the number of the self-capacitance electrodes in the embodiments of the present disclosure based on a specific embodiment.

As illustrated in FIG. 2a, the in-cell touch panel provided by at least one embodiment of the present disclosure comprises: a conductive layer 20 comprising a plurality of hollowed-out regions 21 which are arranged in a matrix form; a plurality of self-capacitance electrodes 10 insulated from the conductive layer 20 and arranged in a layer in which the conductive layer 20 is arranged, and each of the hollowed-out regions 21 being provided therein with one of the self-capacitance electrodes 10; a plurality of conductive wires 40 uncrossed with each other, provided in a layer different from the layer in which the self-capacitance electrodes are arranged, and respectively connecting the self-capacitance electrodes 10 to a margin frame of the in-cell touch panel, each of the self-capacitance electrodes 10 being electrically connected with a conductive wire 40 through a via hole 30, and the self-capacitance electrodes being electrically connected with different conductive wires, respectively; peripheral wires 50 arranged at the margin frame of the in-cell touch panel and connected with each of the conductive wires 40 correspondingly in a one-to-one manner, and a touch detection chip, which is electrically connected with the peripheral wires 50 through corresponding wiring terminals 60 and used for determining a touch position during a touch-scanning time period by detecting the variation of the capacitance value of each of the self-capacitance electrodes 10. FIG. 2a illustrates with respect to an example in which there are 8 rows*6 columns=48 hollowed-out regions, and 8 rows*6 columns=48 self-capacitance electrodes 10.

In the embodiment of the present disclosure, taking the dimension of the touch screen shown in FIG. 2a as an example: when the solution according to the embodiment of the present disclosure is employed, 48 conductive wires 40 are required to be respectively electrically connected with the self-capacitance electrodes 10; and when the solutions shown in FIGS. 1a and 1b are employed, with respect to the dimension of the touch screen, there should be provided with 10 rows*7 columns=70 self-capacitance electrodes, and correspondingly, 70 conductive wires in total are required;

Therefore, the number of the conductive wires used in the embodiment of the present disclosure is less, so that the number of the peripheral wires correspondingly connected with the conductive wires is also reduced, and this facilitates a narrow frame design for the touch screen panel, and also facilitates the reduction of the cost of the touch detection chip.

The in-cell touch panel provided by one embodiment of the present disclosure may further comprise: a black matrix layer provided on the side, facing the lower substrate, of the upper substrate, or on the side, facing the upper substrate, of the lower substrate; and the orthographic projections, upon the lower substrate, of the conductive layer, each of the self-capacitance electrodes and the conductive wires are arranged within the orthographic projection, upon the lower substrate, of the black matrix layer.

In the embodiment of the present disclosure, because the orthographic projections, upon the lower substrate, of the conductive layer, each of the self-capacitance electrodes and the conductive wires are arranged within the orthographic projection, upon the lower substrate, of the black matrix layer, the electric fields produced by the conductive layer and the self-capacitance electrodes cannot influence the electric field in the pixel opening zone, and accordingly cannot influence the normal display. In the embodiment of the present disclosure, because the orthographic projections, upon the lower substrate, of the conductive layer, each of the self-capacitance electrodes and the conductive wires are arranged within the orthographic projection, upon the lower substrate, of the black matrix layer, it is also possible to avoid influencing the transmittance of the in-cell touch panel.

In one embodiment, the pattern of the orthographic projection, upon the lower substrate, of each of the self-capacitance electrodes is of a lattice structure, and arranged within the orthographic projection, upon the lower substrate, of the black matrix layer.

The touch panel usually has its density in millimeter scale, and the display screen usually has its density in micron scale, so one self-capacitance electrode may generally correspond to a plurality of pixel units in the display screen; and in order to ensure that each self-capacitance electrode does not occupy the opening zone of the pixel units, in one embodiment, the positions of each self-capacitance electrode respectively corresponding to the opening zones of the pixel units may be removed The density indicated in the embodiment of the present disclosure refers to the pitch of the self-capacitance electrodes of the touch panel, or the pitch of the pixel unit of the display screen.

Figure 4:
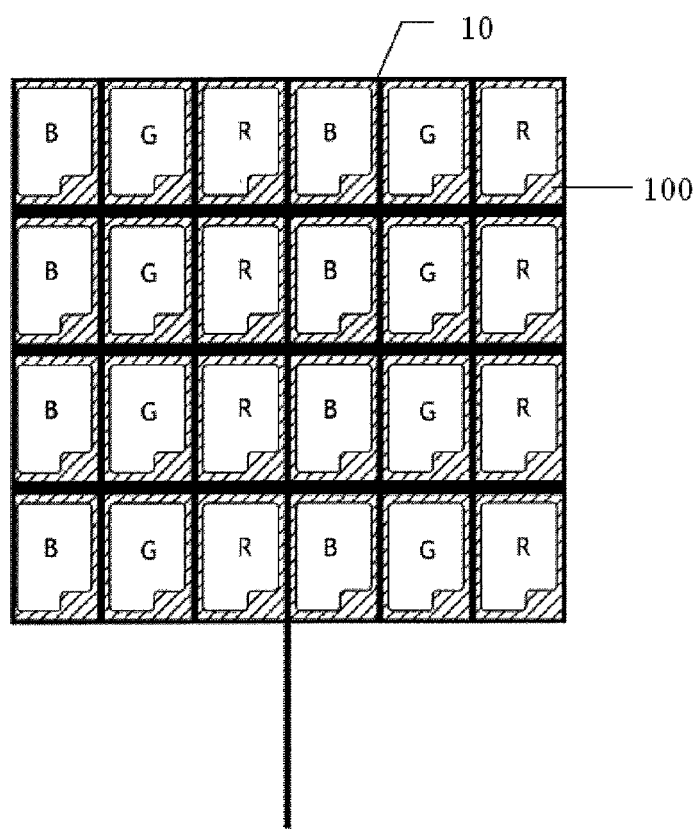
FIG. 4 is a structural schematic view of one self-capacitance electrode in an in-cell touch panel provided by an embodiment of the present disclosure.

For example, with respect to the example that the pattern of the orthographic projection, upon the lower substrate, of each of the self-capacitance electrodes is of a lattice structure arranged within the orthographic projection, upon the lower substrate, of the black matrix layer, as illustrated in FIG. 4, the positions of each self-capacitance electrode 10 respectively corresponding to the opening zones of the pixel unit are removed, and that is, the pattern of each self-capacitance electrode 10 is designed in such a way that its orthographic projection upon the lower substrate presents a lattice structure arranged within the orthographic projection, upon the lower substrate, of the black matrix layer 100. Moreover, in order to ensure the display uniformity, each of the gaps between sub-pixel units of each pixel unit is generally provided therein with the self-capacitance electrode 10, and each group of RGB sub-pixel units forms one pixel unit.

A detailed description will be made to the implementation of the in-cell touch panel according to the embodiments of the present disclosure in the following, with respect to the example that the conductive layer and the self-capacitance electrodes are configured to be used as a common electrode layer, the common electrode layer is arranged between the black matrix layer and the color filter layer, and the conductive wires are arranged on the color filter layer.

Figure 3:
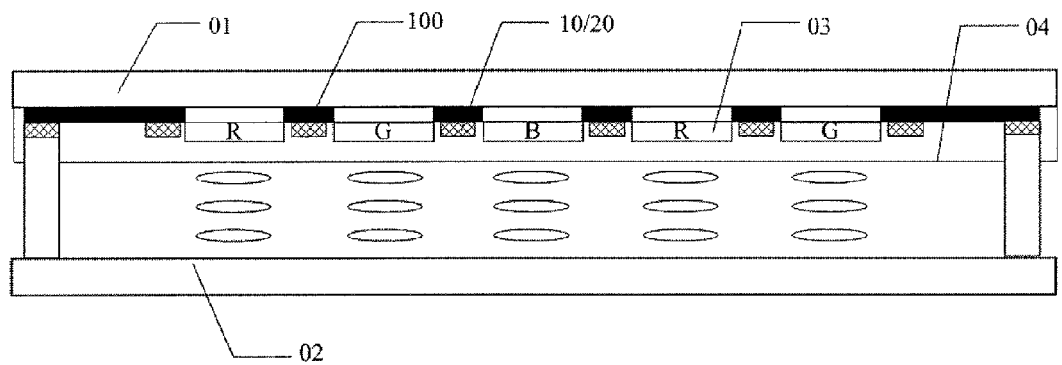
FIG. 3 is a structural schematic side view of an in-cell touch panel according to an embodiment of the present disclosure.

As illustrated in FIG. 3, an in-cell touch panel provided by at least one embodiment of the present disclosure comprises: an upper substrate 01 and a lower substrate 02 arranged oppositely to each other; a black matrix layer 100 arranged on the side, facing the lower substrate 02, of the upper substrate 01; a conductive layer 20 which is arranged on a side, facing the lower substrate 02, of the black matrix layer 100 and comprises a plurality of hollowed-out regions arranged in a matrix form, and self-capacitance electrodes 10 provided in the layer in which the conductive layer is arranged, and insulated from the conductive layer 20, each of the hollowed-out regions being provided therein with one of the self-capacitance electrodes 10; a color filter layer 03 arranged on a side, facing the lower substrate 02, of the film layer in which the conductive layer 20 is arranged; a film layer (not shown in FIG. 3), in which conductive wires are arranged and which is arranged on a side, facing the lower substrate 02, of the color filter layer 03, and moreover, the conductive wires being electrically connected with corresponding self-capacitance electrodes 10 through corresponding via holes (not shown in FIG. 3) in the color filter layer, and a planarization layer 04 arranged on a side, facing the lower substrate 02, of the film layer in which the conductive wires are arranged.

In the embodiment of the present disclosure, the film layer, in which the self-capacitance electrodes are arranged, is provided between the black matrix layer and the color filter layer, and the film layer, in which the conductive wires are arranged, is provided on a side, facing the lower substrate, of the color filter layer, so the interference of body capacitance upon the signals transmitted along the conductive wires can be reduced.

Based on the identical inventive concept, at least one embodiment of the present disclosure also provides a display device comprising the above-mentioned in-cell touch panel provided by any one of the embodiments of the present disclosure. The display device may be any other product or component having a display function, such as a cell phone, a tablet computer, a television, a display, a notebook computer, a digital photo frame, and a navigator. The implementation of this display device may refer to the above-mentioned embodiments of the in-cell touch panel and repeated description is omitted here.

In the embodiment of the present disclosure, because the number of the conductive wires in the in-cell touch panel is reduced, so that the number of the conductive wires in the display device comprising the in-cell touch panel provided by the embodiment of the present disclosure is also reduced, and this facilitates a narrow frame design and reduces the occurrence probability of larger touch blind areas to a certain extent.

At least one embodiment of the present disclosure provides a method for scanning the display device, and the method comprises: performing touch-scanning and display-scanning in a time-sharing manner during one frame time; the touch detection chip applying driving signals to corresponding self-capacitance electrodes in a time-sharing manner through corresponding peripheral wires and corresponding conductive wires connected with the self-capacitance electrodes, during a touch-scanning time period; and receiving feedback signals from the self-capacitance electrodes, and determining a touch position according to the feedback signals.

In the embodiment of the present disclosure, by performing the touch-scanning and display-scanning in a time-sharing manner, it is possible to reduce the mutual interference between the display signals and touch signals, so as to improve the picture quality and touch accuracy. Moreover, in one embodiment, a display drive chip and a touch detection chip may be integrated into one chip so as to reduce the production costs.

In the following, a detailed introduction will be made to the scanning method of the display device in the embodiment of the present disclosure in conjunction with FIG. 5.

Figure 5:
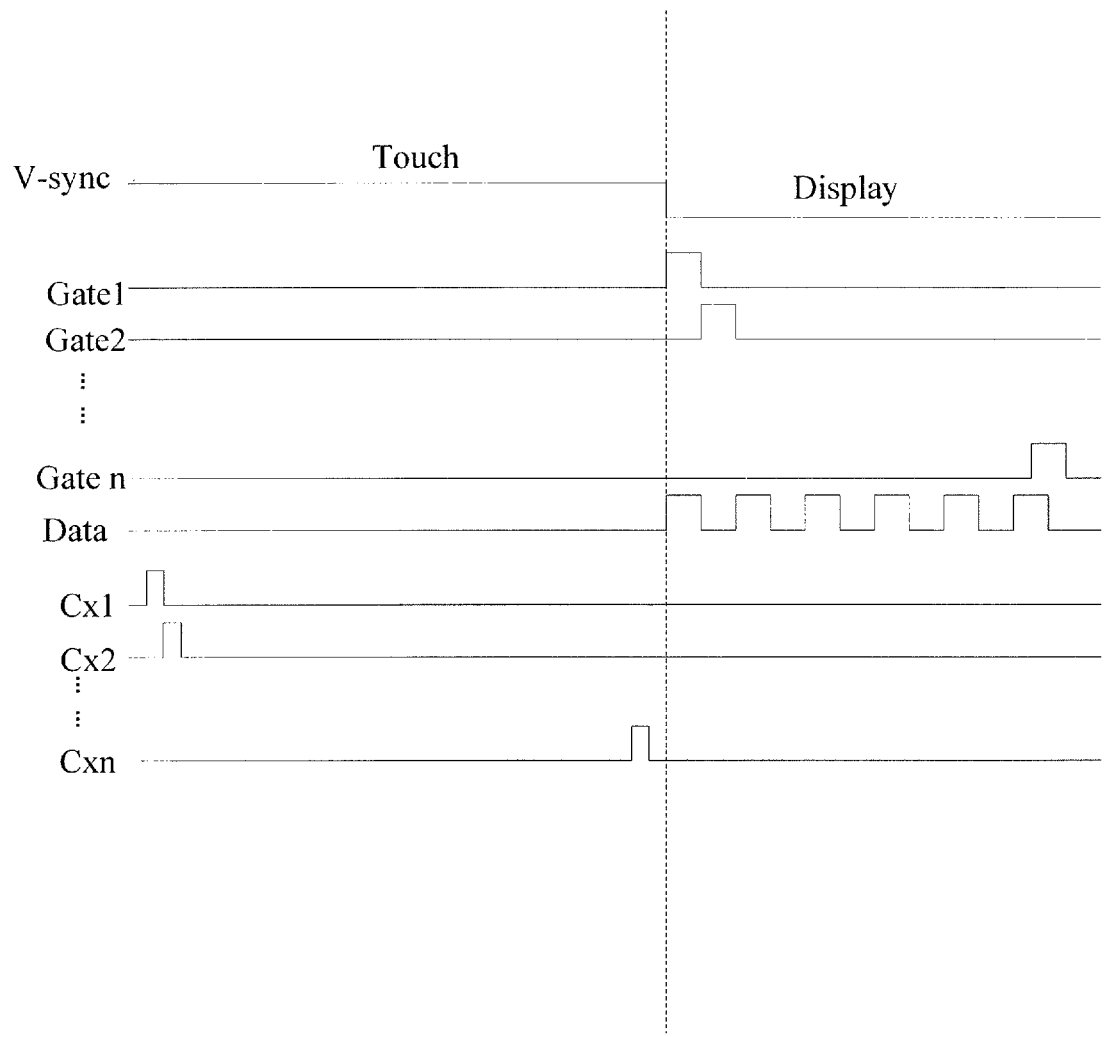
FIG. 5 is a schematic diagram illustrating a drive time sequence of a display device according to an embodiment of the present disclosure.

As illustrated in FIG. 5, the time for the display device to display each frame (V-sync) is divided into a display-scanning time period and a touch-scanning time period. For example, when the time period for the display device to display one frame is 16.7 ms, 5 ms of which is selected as the touch-scanning time period, and the rest 11.7 ms of which is used as the display-scanning time period. Of course, it is also possible to appropriately regulate the duration of the two time periods according to the processing capacity of an IC chip, and specific limitations are not imposed herein. During the display-scanning time period, gate signal lines Gate 1, Gate 2, . . . , Gate n of the display device are successively applied with corresponding scanning signals, and the data signal lines are applied with corresponding gray scale signals, so as to achieve a display function. During the touch time period, the touch detection chip respectively applies driving signals to the self-capacitance electrodes Cx1, . . . , Cx n in a time-sharing manner, and simultaneously, receives feedback signals from the corresponding self-capacitance electrodes Cx1, . . . , Cx n. By analyzing the feedback signals of the corresponding self-capacitance electrodes Cx1, . . . , Cx n, it is possible to determine a touch position so as to achieve a touch function.

In the embodiment of the present disclosure, the implementation that the touch detection chip determines the touch position by analyzing the feedback signals of the corresponding self-capacitance electrodes Cx1, . . . , Cx n may adopt technologies known to the skilled in this art, and repeated description will be omitted herein.

In one embodiment, when the self-capacitance electrodes and the conductive layer are configured to be used as a common electrode layer, during the display-scanning time period, each of the self-capacitance electrodes and the conductive layer are respectively applied with a Vcom voltage. In this way, it is possible to ensure a normal display for the display device.

In one embodiment, when the conductive layer and self-capacitance electrodes are provided on a side, facing the lower substrate, of the upper substrate, during the display-scanning time period, each of the self-capacitance electrodes and the conductive layer are respectively applied with a floating voltage (i.e., dangled). Thus, it is possible to prevent the self-capacitance electrodes and the conductive layer on the upper substrate and the electrodes on the lower substrate from generating opposite electric fields, and this avoids negative influence upon the display of the display device to a certain extent.

In the above-mentioned embodiments, when driving signals are applied to the corresponding self-capacitance electrodes in a time-sharing manner, the touch detection chip may transversely scan each of the self-capacitance electrodes one by one, so as to apply the driving signals to the corresponding self-capacitance electrodes in a time-sharing manner, or, it is also possible for the touch detection chip to vertically scan each of the self-capacitance electrodes one by one, so as to apply the driving signals to the corresponding self-capacitance electrodes in a time-sharing manner.

In one embodiment, during the touch time period, the voltage signal applied to the conductive layer is identical to that applied to each of the self-capacitance electrodes. Thus it is possible to ensure that the conductive layer has a better uniformity with the self-capacitance electrodes.

As one possible embodiment, when the self-capacitance electrodes and the conductive layer are configured to be used as the common electrode layer, a Vcom voltage may also be applied to the common electrode layer during the touch time period (Touch).

Although preferable embodiments of the present disclosure has been described, the skilled person in this art can make other modifications and variations to these embodiments upon learning the basic inventive concept. Therefore, the accompanying claims are intended to cover the preferable embodiments and all the modifications and variations fell within the scope of the present disclosure.

It is apparent to those skilled in the art to make various modifications and variations to the present invention without departing from the spirit and scope of the present invention. In this way, if these modifications and variations belong to the scope of the claims of the present invention and their equivalents, then the present invention is intended to cover these modifications and variations.

The present application claims the priority of the Chinese patent application No. 201410239887.x, filed on May 30, 2014, the entirety of which is incorporated herein by reference as a part of the present application.

What is claimed is:

1. An in-cell touch panel, comprising:
   an upper substrate and a lower substrate, arranged oppositely to each other;
   a conductive layer, provided on a side, facing the lower substrate, of the upper substrate or on a side, facing the upper substrate, of the lower substrate, wherein the conductive layer comprises a plurality of hollowed-out regions arranged in a matrix form;
   a plurality of self-capacitance electrodes, arranged in a layer in which the conductive layer is arranged, and insulated from the conductive layer, wherein each of the hollowed-out regions is provided therein with at least one of the self-capacitance electrodes, and a plurality of conductive wires, uncrossed with each other, respectively electrically connected with the self-capacitance electrodes, and arranged in a layer different from the layer in which the conductive layer is arranged, wherein the conductive wires that the self-capacitance electrodes are respectively connected with are different.

2. The in-cell touch panel according to claim 1, further comprising: a black matrix layer provided on the side, facing the lower substrate, of the upper substrate or on the side, facing the upper substrate, of the lower substrate;
wherein the conductive layer, the self-capacitance electrodes and the conductive wires each have an orthographic projection upon the lower substrate arranged within an orthographic projection, upon the lower substrate, of the black matrix layer.

3. The in-cell touch panel according to claim 2, wherein a pattern of an orthographic projection, upon the lower substrate, of each of the self-capacitance electrodes presents a lattice structure, and is arranged within the orthographic projection, upon the lower substrate, of the black matrix layer.

4. The in-cell touch panel according to claim 3, wherein each of the hollowed-out regions is provided therein with one of the self-capacitance electrodes and a shape of the hollowed-out region is identical to that of the self-capacitance electrode.

5. The in-cell touch panel according to claim 4, wherein each of opposite sides which respectively belong to two adjacent ones of the self-capacitance electrodes comprises a zigzag line.

6. The in-cell touch panel according to claim 5, wherein each of the opposite sides which respectively belong to the two adjacent ones of the self-capacitance electrodes, shaped in the zigzag line, is of a stepped structure, and two stepped structures have a same shape and match each other; and/or
each of the opposite sides which respectively belong to the two adjacent ones of the self-capacitance electrodes, shaped in the zigzag line, is of a concave-convex structure, and two concave-convex structures have a same shape and match each other.

7. The in-cell touch panel according to claim 3, further comprising:
a touch detection chip, electrically connected with the conductive wires and configured for determining a touch position by detecting variation of capacitance value of each of the self-capacitance electrodes during a touch-scanning time period, and
peripheral wires, arranged at a position where a margin frame of the in-cell touch panel is arranged, and respectively electrically connected with the conductive wires;
wherein the conductive wires connect the self-capacitance electrodes to the position where the margin frame of the in-cell touch panel is arranged, respectively; and the touch detection chip is electrically connected with the peripheral wires through wiring terminals.

8. The in-cell touch panel according to claim 2, wherein each of the hollowed-out regions is provided therein with one of the self-capacitance electrodes and a shape of the hollowed-out region is identical to that of the self-capacitance electrode.

9. The in-cell touch panel according to claim 8, wherein each of opposite sides which respectively belong to two adjacent ones of the self-capacitance electrodes comprises a zigzag line.

10. The in-cell touch panel according to claim 9, wherein each of the opposite sides which respectively belong to the two adjacent ones of the self-capacitance electrodes, shaped hi the zigzag line, is of a stepped structure, and two stepped structures have a same shape and match each other; and/or
each of the opposite sides which respectively belong to the two adjacent ones of the self-capacitance electrodes, shaped in the zigzag line, is of a concave-convex structure, and two concave-convex structures have a same shape and match each other.

11. The in-cell touch panel according to claim 2, further comprising:
a touch detection chip, electrically connected with the conductive wires and configured for determining a touch position by detecting variation of capacitance value of each of the self-capacitance electrodes during a touch-scanning time period, and
peripheral wires, arranged at a position where a margin frame of the in-cell touch panel is arranged, and respectively electrically connected with the conductive wires;
wherein the conductive wires connect the self-capacitance electrodes to the position where the margin frame of the in-cell touch panel is arranged, respectively; and the touch detection chip is electrically connected with the peripheral wires through wiring terminals.

12. The in-cell touch panel according to claim 1, wherein each of the hollowed-out regions is provided therein with one of the self-capacitance electrodes and a shape of the hollowed-out region is identical to that of the self-capacitance electrode.

13. The in-cell touch panel according to claim 12, wherein each of opposite sides which respectively belong to two adjacent ones of the self-capacitance electrodes comprises a zigzag line.

14. The in-cell touch panel according to claim 13, wherein each of the opposite sides which respectively belong to the two adjacent ones of the self-capacitance electrodes, shaped in the zigzag line, is of a stepped structure, and two stepped structures have a same shape and match each other; and/or
each of the opposite sides which respectively belong to the two adjacent ones of the self-capacitance electrodes, shaped in the zigzag line, is of a concave-convex structure, and two concave-convex structures have a same shape and match each other.

15. The in-cell touch panel according to claim 1, further comprising:
a touch detection chip, electrically connected with the conductive wires and configured for determining a touch position by detecting variation of capacitance value of each of the self-capacitance electrodes during a touch-scanning time period, and
peripheral wires, arranged at a position where a margin frame of the in-cell touch panel is arranged, and respectively electrically connected with the conductive wires;
wherein the conductive wires connect the self-capacitance electrodes to the position where the margin frame of the in-cell touch panel is arranged, respectively; and the touch detection chip is electrically connected with the peripheral wires through wiring terminals.

16. The in-cell touch panel according to claim 15, wherein the margin frame of the in-cell touch panel comprises four sides, and based on the conductive wires uncrossed with each other, each of the self-capacitance electrodes is connected to a side closest to the self-capacitance electrode through a corresponding conductive wire; or the margin frame of the in-cell touch panel has a rectangular shape, and a direction toward which each of the conductive wires extends is consistent with a short-side direction of the margin frame.

17. The in-cell touch panel according to claim 1, wherein each of the hollowed-out regions is provided therein with one of the self-capacitance electrodes, and a distance between any point of an edge of the self-capacitance electrode and an edge of the hollowed-out region has a minimum value that is smaller than 6 microns; and the conductive layer comprises a plurality of elongated branches respectively arranged between adjacent rows of the hollowed-out regions and adjacent columns of the hollowed-out regions, and a width of each of the branches has a maximum value smaller than 2 millimeters.

18. The in-cell touch panel according to claim 1, wherein the conductive layer and the self-capacitance electrodes are configured to be used as a common electrode layer.

19. The in-cell touch panel according to claim 18, further comprising:

common electrode lines, electrically insulated from gate electrodes and gate lines and arranged in a layer in which the gate electrodes and the gate lines are provided, the gate electrodes and the gate lines being provided on the side, facing the upper substrate, of the lower substrate;

wherein the conductive layer is provided on the side, facing the upper substrate, of the lower substrate; the common electrode lines and the common electrode layer are provided in different layers, and the common electrode lines are respectively electrically connected with the common electrode layer through via holes; and the common electrode lines are configured to be used as the conductive wires.

20. A display device, comprising an in-cell touch panel which comprises:

an upper substrate and a lower substrate, arranged oppositely to each other;

a conductive layer, provided on a side, facing the lower substrate, of the upper substrate or on a side, facing the upper substrate, of the lower substrate, wherein the conductive layer comprises a plurality of hollowed-out regions arranged in a matrix form;

a plurality of self-capacitance electrodes, arranged in a layer in which the conductive layer is arranged, insulated from the conductive layer, wherein each of the hollowed-out regions is provided therein with at least one of the self-capacitance electrodes, and a plurality of conductive wires, uncrossed with each other, respectively electrically connected with the self-capacitance electrode, and arranged in a layer different from the layer in which the conductive layer is arranged, wherein the conductive wires that the self-capacitance electrodes are respectively connected with are different.

\* \* \* \* \*